May 26, 1964   H. C. FOX ETAL   3,134,178
DEVICE FOR PACING READING
Filed March 31, 1961   3 Sheets-Sheet 1
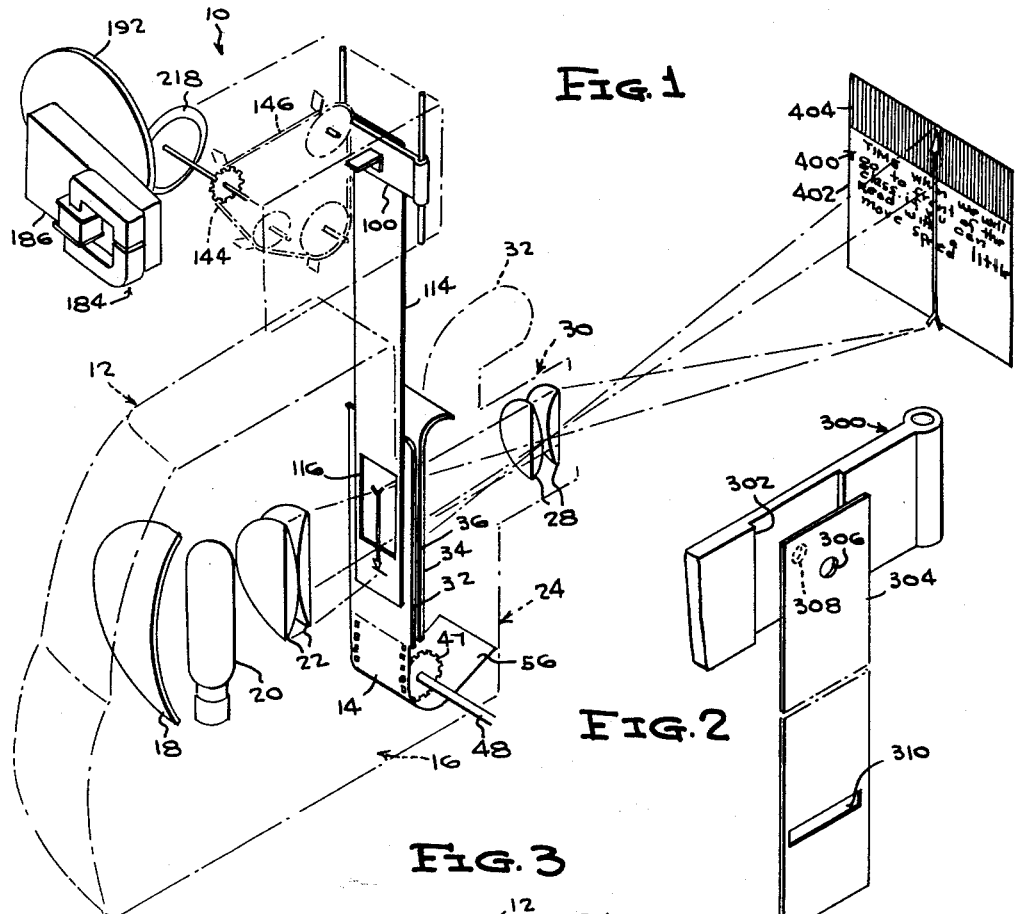
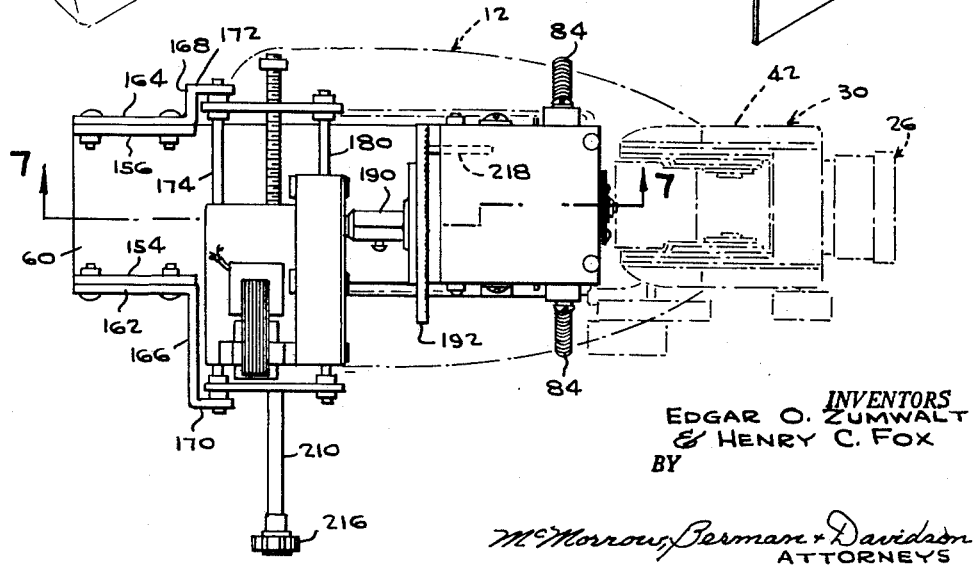
INVENTORS
EDGAR O. ZUMWALT
& HENRY C. FOX
BY
McMorrow, Berman & Davidson
ATTORNEYS

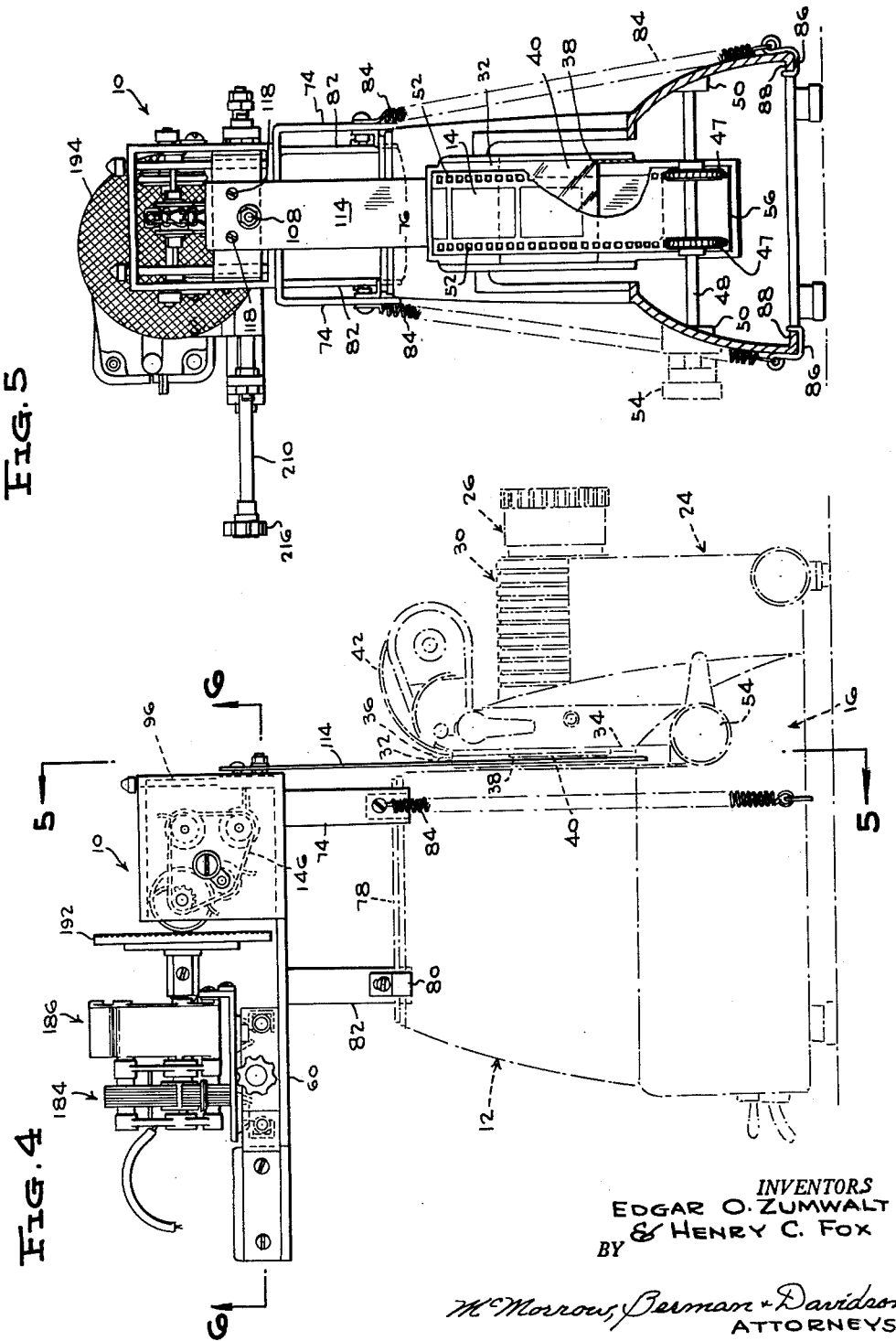

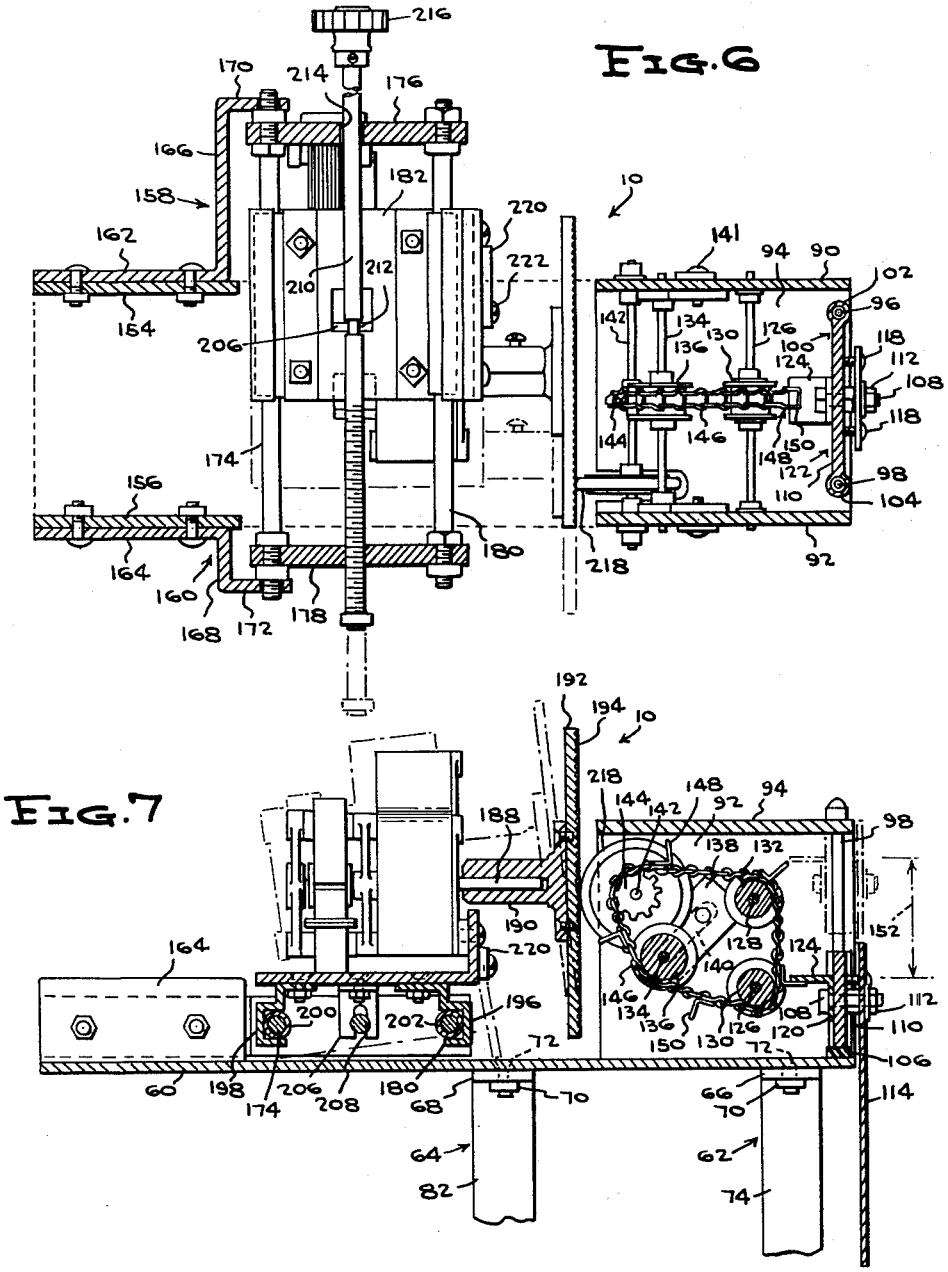

United States Patent Office 3,134,178
Patented May 26, 1964

3,134,178
DEVICE FOR PACING READING
Henry C. Fox, 18 NE. 107th St., and Edgar O. Zumwalt, 1150 NW. 108th St., both of Miami, Fla.
Filed Mar. 31, 1961, Ser. No. 99,909
4 Claims. (Cl. 35—35)

This invention relates to the general field of education, and more specifically, the instant invention pertains to a device for pacing reading.

It is a well known fact that much difficulty has been encountered at the present time in the teaching of children or students to read, and this problem is not a rarity among adults. More particularly, it has been found that students as well as adults are capable of greatly increasing the speed at which they read printed material. It is, therefore, one of the primary objects of this invention to provide a device for pacing reading in order to increase the speed of the visual processes with the ultimate aim of also increasing the psychological processes involved in reading comprehension.

Another object of this invention is to provide a device for pacing reading material, the device being adaptable for mounting on or for attachment to conventional film strip projectors and, preferably, the film strip projector should be capable of conversion to double frame projection.

A further object of this invention is to provide a reading pacing device which is constructed for use in conjunction with a large group of individuals; the device being especially constructed and designed for use in a classroom or even in a large auditorium so that the same may be utilized simultaneously by one or a plurality of viewers.

It is well known that certain reading pacers have been developed and are presently on the market. For example, there is the E.D.L., or Educational Development Laboratories pacer which is designed to project one line or a part of a single line at a given instance. This leads to several psychological objections or drawbacks since a rapid reader is held back to the speed of the pacer and also that it develops improper eye training in that on the return sweep, the eye goes back to the same line and not to the line immediately below as in normal reading. Also, a good reader uses peripheral vision to subconsciously pick the next one of several fixation points. This he is unable to do with the limited exposure of the E.D.L. pacer.

Overhead projecting machines have been used, but this suffers the drawback in that the cost of the materials is quite extensive and considerable difficulty is encountered when attempting to store the device and the materials.

It is, therefore, among the principal objects of this invention to provide a reading pacer device which overcomes the inherent deficiencies and inadequacies of reading pacers heretofore known in this art, the device according to this invention being capable of exposing to one or a plurality of viewers a substantially full sheet of reading material and wherein the reading material is progressively blocked from view.

Still another object of this invention is to provide in a conventional projector, a moving shutter blade disposed in the optical system, the blade being vertically movable to gradually block out the material being projected whereby the reader must read ahead of the blade to obtain the full sense of the projected material.

Still another object of this invention is to provide a reading pacing device with means for gradually blocking out projected reading material together with substantially instantaneous means for unblocking and exposing the material which appears on the next succeeding film frame.

A still further additional object of this invention resides in its ready adaptability as an attachment for conventional projecting machines so that they may, if desired, be used as a tachistoscope.

Another object of this invention is to provide a projection device which is capable of use in a manner analogous to the flash card technique used especially by primary teachers. To carry out this object, a single film frame containing drill words, phrases, number combinations, et cetera, is exposed for a predetermined time chosen by the teacher or instructor and then is moved in sequence with respect to other similar frames in an organized drill procedure. This differs from the tachistoscope in that each view is of comparatively much greater duration.

A further object of this invention is to provide means for setting a definite time interval for the exposure of each frame on the film strip, the frames being adapted to carry advertising subject matter, designs, and compositions of reading matter all of which, in conjunction with a conventional projecting machine, may be coupled with an automatic advancing device to move the film strip in sequence from frame to frame.

Still further, this invention has as another object thereof, the provision of a device of the type generally referred to as supra, the device being non-complex in construction and assembly, relatively inexpensive to manufacture, and one which is durable in use.

Other and further objects and advantages of the instant invention will become more evident from a consideration of the following specification when read in conjunction with the annexed drawings, in which:

FIGURE 1 is a diagrammatic or schematic illustration of a double frame film strip projector together with the attachment or unit constructed in accordance with this invention;

FIGURE 2 illustrates a modification of the blade or shutter for use as a tachistoscope and means for connecting the same to the attachment or unit;

FIGURE 3 is a top plan view of the unit, the projector being shown in phantom lines;

FIGURE 4 is a side elevational view of the attachment or unit, showing the same as being installed on a conventional double frame projector;

FIGURE 5 is a front elevational view of the attachment or unit, together with its associated projector, FIGURE 5 being taken substantially on the vertical plane of line 5—5 of FIGURE 4, looking in the direction of the arrows:

FIGURE 6 is an enlarged detail cross-sectional view, FIGURE 6 being taken substantially on the horizontal plane of line 6—6 of FIGURE 4, looking in the direction of the arrows; and FIGURE 7 is an enlarged detail cross-sectional view illustrating the variable speed drive, FIGURE 7 being taken substantially on the line 7—7 of FIGURE 3, looking in the direction of the arrows.

Referring now more specifically to the drawings, reference numeral 10 designates a group reading pacer device constructed in accordance with the teachings of this invention, the device 10 being illustrated as an attachment for a conventional still picture double frame projector machine 12 utilizing single or double frame film strip 14 of the conventional or usual construction. The projector machine 12 includes a housing 16 for curvilinear reflector 18 disposed to the left or rearwardly of an illumination source 20, as viewed in FIGURE 1. In this instance, the illumination source comprises a conventional electric projection lamp. Disposed forwardly, or to the right of the light or bulb 20, reference again being made to FIGURE 1 of the drawings, is the first or rear lens system 22, this lens system being normally interposed between the light source 20 and the film strip 14.

Forwardly, or to the right of the film strip 14 as viewed in FIGURE 1, and forming a part of the housing 16 is the film gear casing 24 and the adjustable lens mounting 26 for the condensing lens system 28, the mounting including the tubular extension 30 of the gear casing 24.

The projector 12 is provided with the conventional rear and front film strip guide members 32, 34, the guide members comprising plates which are vertically elongated and disposed in laterally spaced relation to form a film strip receiving slot 36 therebetween. The rear and front guide members 32, 34, are formed with aligned substantially rectangular apertures 38 (only one being shown in FIGURES 4 and 5) the apertures being disposed perpendicularly to the optical axis of the condensing system, and the rear aperture 38 is closed by a substantially rectangular transparent plate 40. The rear and front film strip guide members 32, 34 are generally known in this art as comprising a film gate or film gating means.

Reference numeral 42 denotes a film loading compartment from which the film strip 14 is unwound and is passed downwardly between the rear and front guide members 32, 34, and is engaged by the customary sprocket wheels 47 mounted on a laterally extending shaft 48 journalled in suitable bearings 50 disposed on opposite sides of the gear housing 16. The sprocket wheels 47 engage the film strip openings 52 adjacent each side thereof, and the shaft 48 at one end thereof is provided with an operating knob 54, rotation of the latter causing the film strip 14 to move downwardly and into the film strip receiving platform 56. For the purpose of convenience, the shaft 48 may be rotated by automatic timed means, and the latter may be synchronized with the attachment to be described to obtain the optimum benefits of all mechanisms. The advancing mechanism for the film strip 14 is not shown or illustrated herein since the same does not constitute any part of this invention.

It will be understood that the component elements described above are conventional in the art of film strip projection and that this invention is specifically directed to an attachment, accessory, or supplemental unit which could be, if desired, incorporated in the projector as the same is being manufactured.

The unit or accessory 10 is seen to comprise an elongated substantially rectangular base plate 60 to which is secured a pair of inverted L-shaped front supports 62 and a pair of inverted L-shaped rear supports 64. The foot portions 66, 68 of the supports 62, 64, respectively, are rigidly connected to the base plate 60 as by the conventional nuts and bolts 70, 72. The leg portions 74 of the front support 62 each carry inwardly offset flanges 76 adjacent their respective free ends which, when taken in conjunction therewith, form clips adapted to set over the peripheral flange 78 formed at the upper end of the housing 60. Similar, but outwardly offset, flanges 80 are secured to the leg portions 82 of the rear supports 64, the flanges 80 when taken together with the adjacent confronting sides of the leg portions 82 also forming clips which are set over the peripheral flange 78. One end of a helicoidal spring 84 is connected to each of the front leg portions 74, the springs 84 extending downwardly and terminating in clips 86 which engage about a peripheral base flange 88 (see FIGURE 5) of the housing 16.

The forward end of the base plate 60 is integral with a pair of normally upright substantially rectangular side walls 90, 92 which project from opposed marginal sides thereof, and the upper ends of the side walls 90, 92 are bridged by an integral top wall 94.

Fixedly secured to the base plate 60 of the top wall 94, and extending therebetween, are a pair of substantially cylindrical guide rods 96, 98, the guide rods being adjacent to and laterally spaced from the side walls 90, 92. An elongated substantially rectangular slide is indicated at 100. The slide 100 at each end thereof is integrally formed with a pair of enlarged hollow cylindrical bosses 102, 104 which receive the guide rods 96, 98 therein, and a resilient abutment pad 106 is affixed to the base plate 60 immediately below the lower end of the slide 100.

In the front face of the slide 100 is secured, by bolt 108, spacer nut 110 and lock nut 112, the upper end of a vertically depending blade 114 having a transversely extending substantially rectangular window 116 formed therein adjacent its other or lower end. The window 116 has an area substantially equal to the area of the aperture 38 and is normally aligned therewith. Pivotal movement of the blade 114 about the bolt 108 is prevented by screws 118 which extend through the blade 114 and are threaded into the slide 100. As is seen in the several figures, the blade 114 is arranged and disposed for reciprocation immediately behind the rear film strip guide member 32. To serve a function to be described, the leg portion 120 of an inverted L-shaped angle member 122 is fixedly secured by the bolt 108 to the rear face of the slide 100, the foot portion 124 of the angle member 122 projecting towards the rear of the base plate 60.

A pair of shafts 126, 128 extend between and are supported on the side walls 90, 92 in vertically spaced relation. The shafts 126, 128 have rotatably mounted thereon the flanged rollers 130, 132, respectively. Reference numeral 134 denotes the third shaft for a third flanged take-up roller 136 with the opposed ends of the shaft 134 being carried in adjustable substantially rectangular hangers 138 and engaged within slots 140 formed in the side walls 90, 92. Set screws 141 extend through the slots 140 and are threaded into the hangers 138 whereby the latter and consequently the shaft 134 and its roller 136 may be held in adjusted position. Rearwardly and vertically spaced upwardly from the shaft 134 is a fourth shaft 142 which carries a drive sprocket 144. A sprocket chain 146 is trained around the rollers 130, 132 and 136 and meshes with the drive sprocket 144. At regularly spaced intervals L-shaped tabs 148 having offset lips 150 are secured to the chain 146. The spacing of the tabs 148 is such that one of the lips 150 will engage the foot portion 124 of the angle member 122 and as the chain 146 rotates in a counter-clockwise direction, the slide 100 is caused to be lifted the distance indicated by the arrowed line 152 after which the engaged lip 150 escapes and the slide 100 returns to its full line position shown in FIGURE 7, under the force of gravity to be engaged anew by the lip 150 of the next succeeding tab 148.

Reference numerals 154, 156 indicate a pair of upright side walls extending laterally from the rear marginal longitudinally extending sides of the base plate 60. A pair of brackets 158, 160 at one of their respective ends 162, 164, respectively, is connected to the side walls 154, 156. The brackets 158, 160 have intermediate diverging central portions 166, 168 and end portions 170, 172 which extend substantially parallel to the ends 162, 164.

A cylindrical guide rod 174 extends between and is pivotally supported on the end portions 170, 172. One of the ends of a pair of substantially rectangular links 176, 178 are connected to the remotely disposed ends of the guide rod 174, the other ends of the links 176, 178 are connected together by the guide rod 180 which extends parallel to the guide rod 174.

Reference numeral 182 designates a substantially flat rectangular carriage member on which are fixedly connected a conventional electric motor 184 and speed reducer 186. The output shaft 188 of the speed reducer 186 has connected thereon a hub 190 of a drive wheel 192 having a knurled face 194.

Depending from the carriage member 182 adjacent its front and rear ends are a pair of guide brackets 196, 198 which have rigidly secured therein bushings 200, 202, respectively, which are slidably mounted on the rods 174, 180. The rods 174, 180 extend transversely across the base plate 60 and thus, the carriage member 182 may also traverse the base plate 60.

An angle-shaped draw plate 206 depends from the carriage 182 and is formed with a downwardly opening notch 208. A manually operable draw shaft 210 extends between the links 176, 178 and has an intermediate portion of reduced diameter 212 that is received within the notch 208. As seen in FIGURE 6, that end of the shaft 210 which projects through the link 178 is threaded therein and the other end of the shaft 210 projects laterally beyond the link 176 through a smooth opening 214 and is capped with a knob 216.

The drive wheel 192, when the pacer 10 is operating, normally confronts and engages a driven wheel 218 connected to the shaft 142 to effect rotation of the latter. For reasons to be advanced below, one end of a standard 220 is pivotally connected at 222 to the carriage member 182, the standard being of such length that the other end thereof will engage the base plate 60 when the standard is swung to its dotted line position, as shown in FIGURE 7.

FIGURE 2 illustrates a modified form of the slide 100 and the blade 114. In FIGURE 2 the slide is designated at 300 and it is seen that its front face is formed with a transversely extending channel 302 which receives the upper end of a blade 304 therein. The upper end of the blade 304 is bored at 306 to receive a screw therethrough, the latter not being shown, the screw being threadedly received within the tapped opening 308 formed in the slide 300. The blade 304 has also been modified in such a manner as to reduce the vertical dimension of the opening at the other end of the blade. In this case, the opening or window is designated by reference numeral 310 and by comparison with the window 116, it will be noted that the vertical dimension is considerably reduced.

To utilize this invention, let it be assumed that the projector 12 has been loaded with film 14 in the conventional manner. Let it also be assumed that each frame of the film strip 14 carries reading matter 400 to be projected on a screen 402, as illustrated in FIGURE 1 of the drawings.

Now, upon energization of the motor 184, the wheel 194 will begin to rotate to drive the chain 146 in the counterclockwise direction, reference being made to FIGURE 7. This driving action is obtained, of course, through engagement of the wheel 192 with the wheel 218. It will be thoroughly understood that the slide 100 is in its lowermost position and that the window opening 116 is in full registry with the aperture 38 formed in the rear guide member 32. Under these conditions, the printed matter on the exposed frame is total.

As the lip 150 which is in engagement with the foot portion 124 of the angle member secured to the slide 100 begins its upward movement, the blade 114 begins to ascend. As the blade 114 rises, the opaque bottom end thereof begins to gradually intersect the light rays emanating from the lens system 22 and begins gradually to block out the printed matter from the top of the screen towards the bottom, and this condition is illustrated by the shaded upper area indicated at 404 in FIGURE 1.

When the lower end of the blade 114 extends completely across the opening 38 formed in the rear guide member 32, the shaded area 404 will reach the bottom of the printed matter as exposed on the given frame. The window 116, at this time, has been completely moved out of registry with the apertures formed in the front and rear guide members 34, 32, respectively, whereby the screen on which the projected material was formerly observable now becomes completely dark. After the screen is darkened, the blade 114 continues rising momentarily before the lip 150 escapes from beneath the foot portion 124 to allow the slide 100 and its connected blade 114 to move downwardly under the force of gravity to assume their original positions. During the brief period while the screen is dark and during the continued rise of the blade 114 thereafter, the film 14 may be advanced either manually through the knob 54 and the shaft 48, or this may be accomplished automatically in order to present the next frame to the viewer when the blade 114 returns to its original position. That is, there is a sufficient time lag between the complete blocking off of the apertures formed in the gating means to permit the advancing of the next succeeding frame on the film strip before the blade 114 drops to its original position whereby the window 114 is aligned with the apertures or openings formed in the gate means 32, 34.

As has been stated supra, it is recognized that while automatic means for advancing the film strip 114 has not been shown in the drawings, still this invention contemplates that the same may be connected with the shaft 48 to effect the advancement of the film 14. However, and for the purposes of simplicity, the automatic means has not been shown nor described herein. The same is conventional in this art.

The blade 304, illustrated in FIGURE 2 of the drawings, has a relatively small window 310 so that the accessory or unit 10 may be used as a tachistoscope. This is in contrast to the blade 114 since, as is well known, the tachistoscope is used to expose a very small amount of material for a very short space of time, whereas the blade 114, when used as a basic element, exposes an entire page of reading material which, at a predetermined rate, is progressively blacked out on the screen from the top downward.

The attachment 10 is also versatile in that the blacking out speed may be controlled by turning the knob 216 which effects rotation of the shaft 210. The shaft 210 is rotated and the carriage 182 is moved transversely of the base plate 60, and in so moving, the axis of the shaft 188 is moved towards and away from the wheel 218. The further away the shaft 188 is moved from the wheel 218, the greater will be the driving speed of the chain 146.

In the event it is desired to change film strips, or for other purposes, and it is desired to stop the movement of the chain 146, it is only necessary that the operator pivot the carriage member 182 about the shaft 210 and turn the lever 220 downwardly so that the same engages the base plate 60. In this position (see the dotted line position of FIGURE 7) the wheel 192 no longer engages the wheel 218, whereby rotation of the shaft 142 is prevented.

Having described and illustrated this invention in detail, it will be understood, of course, that the same is offered merely by way of example, and that this invention is to be limited only by the scope of the annexed claims.

What is claimed is:

1. A pacer reading device for a film strip projector having a pair of normally upright laterally spaced opaque rectangular film guide members to slidably receive said film strip therebetween, each of said guide members having an aperture therein, said apertures being aligned with one another, a light source, a lens system disposed intermediate said source and one of said guide members, a housing for said source and said system, an elongated substantially rectangular opaque blade having a window extending transversely through said blade adjacent one end thereof, the slide mounted for vertical reciprocation on said housing, said blade having its other end fixedly secured to said slide and having its window normally aligned with said apertures, means on said housing engaging and lifting said slide whereby said window formed in said blade is progressively moved upwardly out of alignment with said apertures and the light rays from said source are progressively blocked from passage through said apertures, and said slide and blade returning to their respective original positions upon disengagement of said means.

2. A pacer reading device for a film strip projector having a pair of normally upright laterally spaced opaque rectangular film guide members to slidably receive said film strip therebetween, each of said guide members having an aperture therein, said apertures being aligned with one another, a light source, a lens system disposed intermediate said source and one of said guide members, a housing for said source and said system, a base plate supported in elevated position on said housing, a slide mounted for vertical reciprocation on said base plate, an opaque elongated substantially rectangular blade having an end thereof fixedly secured to said slide and its other end depending therefrom intermediate said lens system and said one guide member, said blade having a window extending transversely therethrough and normally aligned with said apertures, means supported on said base plate successively engaging and disengaging said slide whereby said slide and blade are raised during said engagement and fall under the force of gravity to their original positions upon said disengagement, said blade progressively blocking passage of light rays through said apertures as said blade and slide are raised, and means on said base plate for adjusting the time interval of said engaging means.

3. A pacer reading device for a film strip projector having a pair of normally upright laterally spaced opaque rectangular film guide members to slidably receive said film strip therebetween, each of said guide members having an aperture therein, said apertures being aligned with one another, a light source, a lens system disposed intermediate said source and one of said guide members, a housing for said source and said system, a base plate supported in elevated position on said housing, a slide mounted for vertical reciprocation on said base plate, an angle member fixedly secured to said slide and having a foot portion thereof projecting laterally therefrom, an opaque elongated substantially rectangular blade having an end thereof fixedly secured to said slide and its other end depending therefrom intermediate said lens system and said one guide member, said blade having the window extending transversely therethrough and normally aligned with said apertures, chain drive means mounted on said base plate, said chain drive means including a plurality of lips projecting laterally therefrom at frequently spaced intervals, said lips being adapted to successively engage and be disengaged from said foot to effect raising of said slide and consequently of said blade upon engagement of one of said lips with said foot portion of said angle member, said foot chain drive means including a rotatable shaft, a wheel fixedly secured to said shaft adjacent an end thereof, motor means supported on said base plate for adjustment transversely thereof, said motor means including a second wheel having a side thereof adapted for engagement with said first wheel, and means for effecting transverse movement of said motor means across said base plate to vary the rotational speed of said first wheel.

4. A pacer reading device as defined in claim 3, and means pivotally connecting said motor means with said base plate whereby said second wheel may be moved out of engagement with said first wheel.

References Cited in the file of this patent
UNITED STATES PATENTS

| | | |
|---|---|---|
| 2,357,593 | Leavell | Sept. 5, 1944 |
| 2,410,237 | Renshaw | Oct. 29, 1946 |
| 3,018,686 | Kurz | Jan. 30, 1962 |